3,102,136
PROCESS OF PREPARING DIIODINATED
ANALOGS OF THYRONINE
Robert I. Meltzer, Rockaway, N.J., assignor to Warner-Lambert Pharmaceutical Company, Morris Plains, N.J., a corporation of Delaware
No Drawing. Filed June 24, 1959, Ser. No. 822,430
7 Claims. (Cl. 260—519)

This invention relates to a new and novel method of preparing diiodinated analogs of thyronine of the formula:

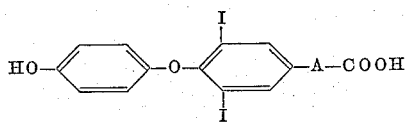

where A is selected from the group consisting of a direct linkage, an alkylene group containing 1 to 3 carbon atoms and a mono-amino substituted alkylene group containing 1 to 3 carbon atoms in the alkylene chain.

The method of the present invention is well adapted to the preparation of 3,5-diiodothyronine:

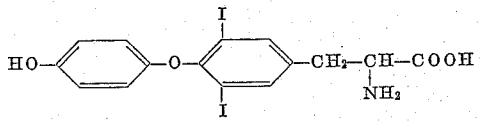

and the desamino analogs of 3,5-diiodothyronine which include the 3,5-diiodothyroaliphatic acids of the foregoing formula where A is an alkylene group containing 1 to 3 carbon atoms. The term alkylene group as used throughout the specification and claims embraces both straight chain and branched chain groups.

There has been considerable interest in recent years in thyroxine which is the hormone of the thyroid gland, and in various derivatives and analogs of thyroxine. For example, 3,5,3'-L-triiodothyronine has been found to have a considerably higher biological activity than thyroxine and this compound has been extensively studied and has also been employed as a substitute for thyroxine for use in the treatment of various thyroid deficiencies. Accordingly, 3,5-diiodothyronine which may be produced in accordance with the method of the present invention has particular utility as an intermediate in the production of the active 3,5,3'-L-triiodothyronine.

3,5-diiodothyroaliphatic acids such as 3,5-diiodothyroformic, -acetic and -propionic acids are essentially inactive in terms of classical thyroxine-like activity. However, these compounds have been found to have interesting properties in that they have the ability to reduce blood serum cholesterol levels in human subjects without appreciable influence on the basal metabolic rate, as described in the copending application of Robert L. Kroc et al., Serial No. 812,140, filed May 11, 1959, and now abandoned. The 3,5-diiodothyroaliphatic acids prepared by the method of this invention have specific utility themselves and also as intermediates since they may be iodinated to produce the corresponding 3,5,3'-triiodothyroaliphatic acids, which also have utility in the reduction of blood serum cholesterol levels. The copending application of Robert L. Kroc, Serial No. 770,611, filed October 30, 1958, describes the use of 3,5,3'-triiodothyropropionic acid in the reduction of blood serum cholesterol levels in humans.

The method heretofore known for the production of 3,5-diiodothyronine and its analogs including 3,5-diiodothyroaliphatic acids have been satisfactory on a laboratory scale, but due to their complexity have tended to be difficult to carry out on a commercial scale since many individual reaction and purification steps are required. Examples of prior art syntheses include the synthesis of 3,5-diiodothyronine as described by Borrows et al. in the Journal of the Chemical Society (London), pages S185 to S204 (1949), and by Harington et al. in Biochemical Journal, 21, 169 (1927), which also describes the preparation of 3,5-diiodothyroformic acid. Harington et al. in Biochemical Journal 50, 438 (1952), describe the synthesis of 3,5-diiodothyroacetic acid, and Clayton et al. in the Journal of the Chemical Society (London), page 2467 (1951), describe the preparation of 3,5-diiodothyropropionic acid. Another chemical synthesis of 3,5-diiodothyroaliphatic acids is described by Meltzer (the applicant herein), Journal of Organic Chemistry, 22, 1577 (1957). In view of the great interest in 3,5-diiodothyronine and its analogs, there has long been need for an efficient and commercially feasible synthesis of compounds of this type.

It is, therefore, a particular object of the present invention to provide an improved method for the efficient and economical production of 3,5-diiodothyronine and its analogs.

Other objects of this invention will be apparent from the following detailed description.

It has now been discovered that compounds of the formula:

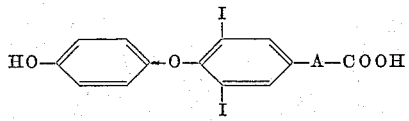

where A is a direct linkage, an alkylene group containing 1 to 3 carbon atoms or a mono-amino substituted alkylene group containing 1 to 3 carbon atoms in the alkylene chain may be prepared by reacting compounds of the formula:

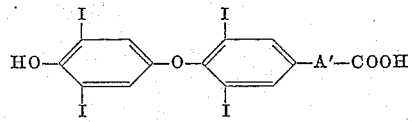

where A' is a direct linkage, a alkylene group containing 1 to 3 carbon atoms, or a mono-amino or a mono-acylamino substituted alkylene group containing 1 to 3 carbon atoms in the alkylene chain with hypophosphorous or phosphorous acid and a hydrohalic acid selected from the group consisting of hydriodic acid and hydrobromic acid.

The starting materials which are deiodinated in accordance with the process of this invention are 3,5,3',5'-tetraiodinated analogs of thyronine. Useful starting materials include thyroxine, 3,5-diiodo-4(4'-hydroxy-3',5'-diiodophenoxy) - phenyl - β - alanine, 3,5 - diiodo - 4(4'-hydroxy-3',5'-diiodophenoxy)phenylglycine, 3,5,3',5' - tetraiodothyro-β-aminobutyric acid and the like, N-acyl derivatives of the above compounds such as N-acylthyroxine and the like wherein the acyl radical includes the acyl radical of aliphatic carboxylic acids, such as acetyl, propionyl, butyryl and formyl and the acyl radical of aromatic carboxylic acids, such as benzoyl, and 3,5,3',5'-tetraiodothyroaliphatic acids as the formic, acetic, propionic, butyric, β-methylpropionic and α-methylpropionic acid analogs. The starting material may be added in either the free acid form or as a metal salt of the free acid. The reaction mixture is highly acidic with the result that the starting material will be present in the reaction mixture as the free acid regardless of the particular form in which it is added initially.

In the method of the present invention the tetraiodinated starting material is deiodinated to form a 3,5-diiodo analog of thyronine. When the starting material is a 3,5,3',5'-tetraiodothyroaliphatic acid, the product of the reaction is the corresponding 3,5-diiodothyroaliphatic acid. When the side chain of the tetraiodinated starting material is an amino acid or an acylamino acid moiety, the product of the reaction is the corresponding 3,5-diiodo analog of thyronine with an amino acid side chain, the amino group being substituted on the side chain in the deiodinated product at the same point as the amino group or acylamino group is substituted on the side chain of the starting material.

It is a particular feature of the present invention that it affords a commercially feasible method of preparing 3,5-diiodo analogs of thyronine. The tetraiodinated starting material may be readily obtained in accordance with known prior art procedures. For example, U.S. Patent 2,803,654 describes the production of N-acylthyroxine by the incubation of the readily available N-acyl-3,5-diiodotyrosine. The incubation may be conveniently carried out by passing oxygen through a solution of an N-acyl-3,5-diiodotyrosine in a basic medium at a temperature of about 37 to 65° C. in the presence of a metallic catalyst. The resulting N-acylthyroxine may be converted in accordance with this invention to 3,5-diiodothyronine or, alternately, may be hydrolyzed to yield thyroxine which in turn may be converted in accordance with this invention to 3,5-diiodothyronine.

By procedures analogous to those described in U.S. Patent 2,803,654, other analogs of thyronine having amino acid and acylamino acid side chains may be readily obtained and the resulting tetraiodinated compounds may be used as starting materials in the method of this invention.

For example, Matsuura et al. in the Journal of the American Chemical Society, 81, 871 (1959), describe a method for the direct synthesis of 3,5,3′,5′-tetraiodothyroaliphatic acids by the incubation at a pH of about 7.5 of 4-hydroxy-3,5-diiodophenylaliphatic acids.

It is to be understood that the above references to recognized syntheses of tetraiodo analogs of thyronine are merely illustrative, and that the method of the present invention is adaptable to the preparation of diiodo analogs of thyronine, regardless of the particular method used to prepare the starting material. Of course, optimum advantages in commercial operation are obtained when the starting material is prepared by as efficient a process as possible.

The deiodination reaction of the present invention is carried out by the reaction of the tetraiodinated starting material with a mixture of hypophosphorous or phosphorous acid and a hydrohalic acid selected from the group consisting of hydriodic acid and hydrobromic acid. The use of a mixture of hypophosphorous acid and hydriodic acid has been found to be particularly effective. It is desirable for maximum yields that there be sufficient hypophosphorous or phosphorous acid present in the reaction mixture to reduce all the iodine formed in the deiodination reaction to iodide ion, that is, in excess of one reductive equivalent in the reduction of iodine to iodide ion per mole of the starting material.

The reaction is most conveniently carried out by refluxing a mixture of the starting material, the hypophosphorous or phosphorous acid and the hydrohalic acid in a suitable solvent for the starting material. Glacial acetic acid is a particularly useful solvent for tetraiodinated analogs of thyronine, and accordingly is a preferred solvent for use in this invention.

It is also desirable that the reaction be carried out in the absence of air in order to prevent any premature oxidation of the hypophosphorous or phosphorous acid present in the reaction mixture. This condition may be obtained by insuring that the reaction vessel is filled with a blanket of an inert gas, for example, nitrogen or carbon dioxide.

It has been found that a reaction time in the range of about 3 to about 20 hours is desirable. Excessively long reaction times should be avoided since the over-all yield of the desired diiodinated product becomes reduced due to the formation of undesired by-products. With too short a reaction time, yields are also reduced due to insufficient conversion of the starting material.

The temperature for the deiodination reaction should preferably be within the range of about 90 to about 150° C. Lower temperatures are not economically feasible due to the necessity of excessively long reaction times. At higher temperatures, the yield is reduced to formation of by-products.

At the conclusion of the reaction, the reaction mixture is processed for recovery of the diiodinated finished product. The reaction mixture may be diluted with a large volume of water which precipitates the finished product. The precipitate is then recovered by filtration and further purified by repeated crystallization from such solvents as aqueous hydrochloric acid or aqueous acetic acid. Alternately, the solvent may be evaporated from the reaction mixture at the completion of the reaction, and the residual oil neutralized with aqueous alkali, for example, sodium or potassium hydroxide. The resulting precipitate, which constitutes the purified diiodinated finished product, may then be separated by filtration and recrystallized for further purification.

In order further to illustrate this invention, the following examples are given:

*Example I*

A quantity of 500 mg. of sodium L-thyroxine pentahydrate is refluxed for 4¾ hours with a mixture of 75 ml. glacial acetic acid, 10 ml. of 47 percent hydriodic acid and 0.8 ml. of 30 percent hypophosphorous acid in an atmosphere of nitrogen. At the conclusion of the reaction the solvents are evaporated under vacuum, the residual oil neutralized with sodium hydroxide and the resulting precipitate collected. A yield of 79 percent of 3,5-L-diiodothyronine is obtained.

*Example II*

A quantity of 500 mg. of sodium L-thyroxine pentahydrate is refluxed for 4½ hours with 55 ml. glacial acetic acid, 7.5 ml. of 47 percent hydriodic acid, and 0.6 ml. of 30 percent hypophosphorous acid in an atmosphere of nitrogen. The product is recovered in the same manner as described in Example I and the 3,5-L-diiodothyronine formed is obtained in a high yield.

*Example III*

A quantity of 500 mg. of sodium L-thyroxine pentahydrate is refluxed for 4 hours with a mixture of 60 ml. glacial acetic acid, 20 ml. of 47 percent hydriodic acid and 0.5 ml. of 30 percent hypophosphorous acid in an atmosphere of nitrogen. After recovery of the product in the manner described in Example I, a yield of 95 percent of 3,5-diiodothyronine is obtained. After recrystallization from 4 N HCl, a product is obtained having a melting point of 251–252° C. and an $[\alpha]_D^{25}$ of −25.8° in 1 part of 1 N HCl mixed with 2 parts ethanol. Pure 3,5-L-diiodothyronine recrystallized from hydrochloric acid has a melting point of 256° C. and an $[\alpha]_D^{25}$ of −26°.

*Example IV*

A quantity of 500 mg. sodium L-thydroxine pentahydrate is refluxed for 20 hours in an atmosphere of nitrogen with a mixture of 40 ml. glacial acetic acid, 12 ml. 40 percent hydrobromic acid and 0.5 ml. of 30 percent hypophosphorous acid. The product obtained after recovery in the manner described in Example I is 3,5-L-diiodothyronine.

*Example V*

A quantity of 5 grams of N-acetyl-L-thydroxine is refluxed for 6 hours in an atmosphere of nitrogen, with a mixture of 250 ml. glacial acetic acid, 50 ml. of 47 percent hydriodic acid, and 6 ml. of 30 percent hypophosphorous acid. The product formed is 3,5-L-diiodothyronine which is obtained in high yield by treatment of the reaction mixture as described in Example I. After four recrystallizations from 4 N HCl, the product obtained shows an $[\alpha]_D^{25}$ of $-24.4°$.

*Example VI*

A quantity of 2 grams of 3,5,3',5'-tetraiodothyroacetic acid is refluxed for 10 hours in an atmosphere of carbon dioxide with a mixture of 4 ml. glacial acetic acid, 14 ml. of 47 percent hydriodic acid, and 1 ml. of 30 percent hypophosphorous acid. At the conclusion of the reaction, the mixture is diluted with 200 ml. water and filtered and the solids are washed and then dried at 60° C. to yield a quantity of 1.1 grams. The dried solids are recrystallized from a mixture of 3 parts by weight of glacial acetic acid and 2 parts by weight of water, to yield 0.9 gram of product having a melting point of 217 to 219° C. 3,5-diiodothyroacetic acid is reported by Wilkinson in Biochemical Journal 63, 601 (1956), as having a melting point of 219° C.

The foregoing examples illustrate the deiodination method of the present invention as applied to 3,5,3',5'-tetraiodinated analogs of thyronine with aliphatic acid side chains and with mono-amino or mono-acylamino substituted aliphatic acid side chains. It is a particular feature of the method of this invention that the diiodinated products are obtained in high yields without the formation of significant quantities of undesired by-products. In the case of the reaction of starting materials having a mono-amino or mono-acylamino substituted aliphatic acid side chain, such as thyroxine or N-acylthyroxine, the stereo configuration of the finished product is the same as that of the starting material. Thus L-thyroxine or N-acyl-L-thydroxine, when deiodinated by the method of this invention, yields 3,5-L-diiodothyronine without any significant amount of racemization occurring during the reaction.

The diiodinated product obtained may be used therapeutically in this form or may be iodinated further to form the corresponding 3,5,3'-triiodinated compound. This iodination of diiodo analogs of thyronine to produce the corresponding triiodinated analogs is well-known and may be carried out, for example, by employing a mixture of iodine and potassium iodide as the iodinating agent.

It is understood that the foregoing detailed description is given merely by way of illustration and that many variations may be made therein without departing from the spirit of my invention.

Having described my invention, what desired to secure by Letters Patent is:

1. A method of preparing diiodinated analog of thyronine of the formula:

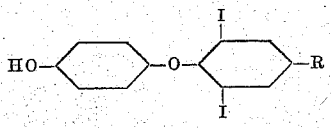

wherein R is a member selected from the group consisting of carboxyl and radicals of the formula —A—COOH where A is a member selected from the group consisting of alkylene and mono-amino substituted alkylene containing 1 to 3 carbon atoms in the alkylene chain, which comprises reacting tetraiodinated analogs of thyronine of the formula:

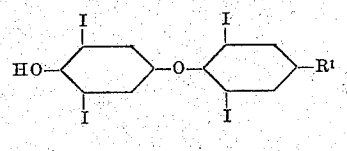

wherein $R^1$ is a member selected from the group consisting of carboxyl and radicals of the formula —$A^1$—COOH where $A^1$ is a member selected from the group consisting of alkylene, mono-amino substituted alkylene and mono-carboxylic-acylamino substituted alkylene containing 1 to 3 carbon atoms in the alkylene chain with a mixture of a hydrohalic acid selected from the group consisting of hydriodic and hydrobromic acid with an acid selected from the group consisting of hypophosphorous acid and phosphorous acid in an amount in excess of one reductive equivalent in the reduction of iodine to iodide ion per mol of said tetraiodinated analog of thyronine while employing a reaction temperature of 90° to about 150° C. from about 3 to about 20 hours.

2. Process in accordance with claim 1 wherein glacial acetic acid is employed as a solvent.

3. A method according to claim 1 wherein said acid is hypophosphorous acid.

4. A method according to claim 3 wherein said hydrohalic acid is hydriodic acid.

5. A method of preparing 3,5-diiodothyroaliphatic acids of the formula:

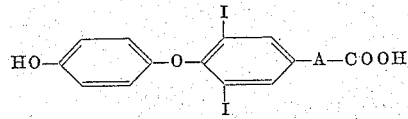

where A is an alkylene group containing 1 to 3 carbon atoms which comprises refluxing a solution of a 3,5,3',5'-tetraiodothyroaliphatic acid of the formula:

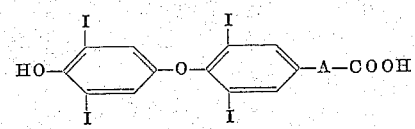

in glacial acetic acid with hydriodic acid and a quantity of hypophosphorous acid in excess of one reductive equivalent in the reduction of iodine to iodide ion per mole of said 3,5,3',5'-tetraiodothyroaliphatic acid.

6. A method of producing 3,5-diidothyronine which comprises refluxing a solution of thyroxine in glacial acetic acid with hydriodic acid and a quantity of hypophosphorous acid in excess of one reductive equivalent in the reduction of iodine to iodide ion per mole of said thyroxine.

7. A method of producing 3,5-diiodothyronine which comprises refluxing a solution of N-acetylthyroxine in glacial acetic acid with hydriodic acid and a quantity of hypophosphorous acid in excess of one reductive equivalent in the reduction of iodine to iodide ion per mole of said N-acetylthyroxine.

References Cited in the file of this patent

UNITED STATES PATENTS 2,950,315    Anthony    Aug. 23, 1960

OTHER REFERENCES

Sprott et al.: "Biochemical Journal," vol. 59 (1955), pp. 288–294.

Ephraim: Inorganic Chemistry, pp. 714 and 715 (1943). (Copy in Division 38.)